United States Patent
Hoyle et al.

(10) Patent No.: US 10,503,735 B2
(45) Date of Patent: Dec. 10, 2019

(54) METHODS AND APPARATUSES FOR IMPROVED DATABASE DESIGN

(71) Applicant: MCKESSON CORPORATION, San Francisco, CA (US)

(72) Inventors: Keith Hoyle, Montgomery, TX (US); Marion A. Brown, Spring, TX (US); Swati Yenneti, Shenandoah, TX (US); Sujatha Kestur, Tomball, TX (US); Gowri Dhandayudhapani, Irving, TX (US)

(73) Assignee: MCKESSON CORPORATION, San Francisco, CA (US)

( * ) Notice: Subject to any disclaimer, the term of this patent is extended or adjusted under 35 U.S.C. 154(b) by 353 days.

(21) Appl. No.: 15/447,003

(22) Filed: Mar. 1, 2017

(65) Prior Publication Data
US 2018/0253474 A1 Sep. 6, 2018

(51) Int. Cl.
| | |
|---|---|
| G06F 16/22 | (2019.01) |
| G06F 16/2455 | (2019.01) |
| G06F 16/2453 | (2019.01) |
| G06F 16/21 | (2019.01) |

(Continued)

(52) U.S. Cl.
CPC ...... *G06F 16/24544* (2019.01); *G06F 16/212* (2019.01); *G06F 16/22* (2019.01); *G06F 16/2282* (2019.01); *G06F 16/248* (2019.01); *G06F 16/2453* (2019.01); *G06F 16/2455* (2019.01); *G06F 16/9535* (2019.01)

(58) Field of Classification Search
CPC .................. G06F 16/2282; G06F 16/2455
See application file for complete search history.

(56) References Cited

U.S. PATENT DOCUMENTS

| | | | |
|---|---|---|---|
| 2011/0264618 A1* | 10/2011 | Potdar ............... | G06F 16/242 707/602 |
| 2014/0279977 A1* | 9/2014 | Milousheff ......... | G06F 16/904 707/695 |

(Continued)

OTHER PUBLICATIONS

In re: Hoyle, U.S. Application titled Methods and Apparatuses for Improved Data Modeling Using a Relational Database Management System; U.S. Appl. No. 15/086,266, filed Mar. 31, 2016.
(Continued)

*Primary Examiner* — Kris E Mackes
(74) *Attorney, Agent, or Firm* — Ballard Spahr LLP

(57) ABSTRACT

Embodiments are disclosed for utilizing an efficient database architecture while facilitating query flexibility. An example method includes generating, by data modeling circuitry of a database system, a database comprising a set of dimension tables and a hybrid fact table, wherein each hybrid fact table record identifies corresponding records in the set of dimension tables that specify (i) current values of the one or more attributes corresponding to the hybrid fact table record and (ii) records comprising historical values of the one or more attributes corresponding to the hybrid fact table record that were current at the time of creation of the hybrid fact table record. The example method further includes receiving a query, and generating and transmitting a response to the received query. Corresponding apparatuses and computer program products are also provided.

20 Claims, 6 Drawing Sheets

(51) Int. Cl.
*G06F 16/248* (2019.01)
*G06F 16/9535* (2019.01)

(56) References Cited

U.S. PATENT DOCUMENTS

2017/0364556 A1* 12/2017 Anantharajaiah ....... G06F 17/18
2018/0300362 A1* 10/2018 Vasudevan .............. G06F 17/40

OTHER PUBLICATIONS

In re: Hoyle, U.S. Application titled Methods and Apparatuses for Improved Data Ingestion Using Standardized Plumbing Fields; U.S. Appl. No. 15/086,534, filed Mar. 31, 2016.

* cited by examiner

FIG. 2A

SCD-7 Patient Dimension Table

| SCD2 Key | SCD1 Key | Name | Address | ... |
|---|---|---|---|---|
| AAA | 111 | Ken O'Horgle | Power Station | ... |
| EEE | 111 | Ken O'Horgle | Nuclear Plant | ... |
| III | 111 | Ken O'Horgle | National Park | ... |

FIG. 2B

SCD-7 Provider Dimension Table

| SCD2 Key | SCD1 Key | Name | Primary Specialty | ... |
|---|---|---|---|---|
| BBB | 222 | Marion Brown | Hematology | ... |
| FFF | 222 | Marion Brown | Cancer | ... |
| JJJ | 222 | Marion Brown | Prostate Cancer | ... |

FIG. 2C

SCD-7 Practice Dimension Table

| SCD2 Key | SCD1 Key | Name | Address | ... |
|---|---|---|---|---|
| CCC | 333 | Brown Institute | 123 Main St. | ... |
| GGG | 333 | Brown Institute, LLP | 123 Elm St. | ... |
| KKK | 333 | Brown & Brown Institute, LLP | 123 Elm St. | ... |

FIG. 2D

SCD-7 Patient Outcome Dimension Table

| SCD2 Key | SCD1 Key | Name | Description | ... |
|---|---|---|---|---|
| DDD | 444 | Cancer Free | Cured | ... |
| HHH | 444 | No Evidence of Cancer | Cured | ... |
| LLL | 444 | No Evidence of Disease | Cured | ... |

FIG. 2E

SCD1 Outcome Fact Table

| SCD1 Patient Key | 111 | 111 |
| SCD1 Provider Key | 222 | 222 |
| SCD1 Practice Key | 333 | 333 |
| SCD1 Patient Outcome Key | 444 | 444 |
| Charge Amount | $100.00 | $200.00 |
| Date Key | 20150704 | 20150704 |
| ... | | |

FIG. 2F

SCD2 Outcome Fact Table

| SCD2 Patient Key | III | III |
| SCD2 Provider Key | FFF | FFF |
| SCD2 Practice Key | CCC | CCC |
| SCD2 Patient Outcome Key | HHH | HHH |
| Charge Amount | $100.00 | $200.00 |
| Date Key | 20150704 | 20150704 |
| ... | | |

Hybrid Outcome Fact Table

| | |
|---|---|
| SCD2 Patient Key | III | III |
| SCD1 Patient Key | 111 | 111 |
| SCD2 Provider Key | FFF | FFF |
| SCD1 Provider Key | 222 | 222 |
| SCD2 Practice Key | CCC | CCC |
| SCD1 Practice Key | 333 | 333 |
| SCD2 Patient Outcome Key | HHH | HHH |
| SCD1 Patient Outcome Key | 444 | 444 |
| Charge Amount | $100.00 | $200.00 |
| Date Key | 20150704 | 20150704 |
| ... | | |

302 — SCD2/SCD1 Patient Key
304 — SCD2/SCD1 Provider Key
306 — SCD2/SCD1 Practice Key
308 — SCD2/SCD1 Patient Outcome Key

FIG. 3E

SCD-7 Patient Dimension Table

| SCD2 Key | SCD1 Key | Name | Address | ... |
|---|---|---|---|---|
| AAA | 111 | Ken O'Horgle | Power Station | |
| EEE | 111 | Ken O'Horgle | Nuclear Plant | |
| III | 111 | Ken O'Horgle | National Park | |

FIG. 3A

SCD-7 Provider Dimension Table

| SCD2 Key | SCD1 Key | Name | Primary Specialty | ... |
|---|---|---|---|---|
| BBB | 222 | Marion Brown | Hematology | |
| FFF | 222 | Marion Brown | Cancer | |
| JJJ | 222 | Marion Brown | Prostate Cancer | |

FIG. 3B

SCD-7 Practice Dimension Table

| SCD2 Key | SCD1 Key | Name | Address | ... |
|---|---|---|---|---|
| CCC | 333 | Brown Institute | 123 Main St. | |
| GGG | 333 | Brown Institute, LLP | 123 Elm St. | |
| KKK | 333 | Brown & Brown Institute, LLP | 123 Elm St. | |

FIG. 3C

SCD-7 Patient Outcome Dimension Table

| SCD2 Key | SCD1 Key | Name | Description | ... |
|---|---|---|---|---|
| DDD | 444 | Cancer Free | Cured | |
| HHH | 444 | No Evidence of Cancer | Cured | |
| LLL | 444 | No Evidence of Disease | Cured | |

FIG. 3D

| Patient | | Provider | | Practice | | Patient Outcome | | Charge |
|---|---|---|---|---|---|---|---|---|
| Name | Address | Name | Primary Specialty | Name | Address | Name | Desc. | Amount |

As-Is Reporting

| Ken O'Horgie | National Park | Marion Brown | Prostate Cancer | Brown & Brown Institute, LLP | 123 Elm St. | No Evidence of Disease | Cured | $200.00 |

As-Was Reporting

| Ken O'Horgie | National Park | Marion Brown | Cancer | Brown Institute | 123 Main St. | No Evidence of Disease | Cured | $200.00 |

As-Would-Have-Been Reporting

| Ken O'Horgie | National Park | Marion Brown | Prostate Cancer | Brown & Brown Institute, LLP | 123 Elm St. | No Evidence of Disease | Cured | $100.00 |

FIG. 3F

METHODS AND APPARATUSES FOR IMPROVED DATABASE DESIGN

TECHNOLOGICAL FIELD

Example embodiments of the present invention relate generally to database management and, more particularly, to methods and apparatuses that utilize an efficient database architecture while facilitating query flexibility.

BACKGROUND

Traditionally, databases have had difficulty accommodating both "as-is" and "as-was" reporting functionality in an efficient manner. An "as-is" query requests data using its current attribute values, regardless of whether some attribute values are different now than they were when the data was originally ingested into the database. For instance, in a database storing company metrics and business-related outcomes, an example of an "as-is" query would be a request for the past year's revenue numbers using the current commission hierarchy. In this query, "as-is" dimension attribute values (the current commission hierarchy) can be retrieved by a database that utilizes slowly changing dimension 1 (SCD-1 or type 1) data tables, in which new attribute values simply overwrite older attribute values. However, because type 1 architectures reflect only the most recent attribute values and overwrite historical values to do so, type 1 data tables are unable to perform historical data reporting.

An "as-was" query is a request for point-in-time reporting in which attributes are requested not using current attribute values, but using attributes as they existed at some prior point in time. Using the example database mentioned above, an example of an "as-was" request would be a request for the past year's revenue numbers using the commission hierarchy that existed at that time. In this query, "as-was" dimension attribute values (the historical commission hierarchy) cannot be retrieved using a type 1 architecture. To properly respond to the query, the database architecture must be able to retain historical attribute values, and a common method for retaining such information is to use a slowly changing dimension 2 (SCD-2 or type 2) technique in which the modification of an attribute value is made by adding a new record (containing the new attribute value) to a data table, rather than by overwriting attribute values of an existing record. By operating in this fashion, type 2 architectures retain all historical information, and thus provide the ability to respond to an "as-was" query.

Because type 1 architectures enable responding to "as-is" queries and type 2 architectures enable responding to "as-was" queries, database schemas for which both "as-is" and "as-was" reporting are required have historically been designed to include complete sets of type 1 dimensions and facts and to also include complete sets of type 2 dimensions and facts. However, this process requires redundant storage of data, which requires duplication of processing, development, testing, and maintenance of both the type 1 and the type 2 dimensions and facts.

BRIEF SUMMARY

Example embodiments described herein address the above deficiencies and provide methods and apparatuses that enable database systems to provide "as-is" and "as-was" reporting functionality while significantly reducing the processing, storage, and data redundancy requirements of traditional methods for providing this functionality. Specifically, example embodiments contemplate the use of a hybrid fact table in which records store the business keys and primary keys for every corresponding dimension table, thus providing the flexibility to efficiently query the database for any combination of current and/or historical facts and attributes without the need to generate new fact tables for any such query.

In a first example embodiment, a method is provided for utilizing an efficient database architecture while facilitating query flexibility. The method includes generating, by data modeling circuitry of a database system, a database comprising a set of dimension tables and a hybrid fact table. The set of dimension tables (i) specifies current values of one or more attributes corresponding to hybrid fact table records and (ii) preserves records of historical values of the one or more attributes, and each hybrid fact table record identifies corresponding records in the set of dimension tables that specify (i) current values of the one or more attributes corresponding to the hybrid fact table record and (ii) records comprising historical values of the one or more attributes corresponding to the hybrid fact table record that were current at the time of creation of the hybrid fact table record. The method further includes receiving a query requesting data from the database, generating, by query response circuitry of the database system, a response to the received query using the set of dimension tables and the hybrid fact table; and transmitting, by the query response circuitry, the response to the received query.

In some embodiments of the method, the query specifies whether current or historical values of attributes corresponding to the hybrid fact table record are requested from each dimension table of the set of dimension tables.

In some embodiments of the method, each hybrid fact table record identifies the corresponding records in the set of dimension tables by including two fields for each dimension table in the set of dimension tables, and the two fields for each particular dimension table store respective pointers comprising (i) a first pointer that specifies a record in the particular dimension table storing current values of attributes corresponding to the hybrid fact table record, and (ii) a second pointer that specifies a particular record in the particular dimension table storing values of the attributes stored in the particular dimension table that were current at the time of creation of the hybrid fact table record. In this regard, the first pointer may be a business key corresponding to the record in the particular dimension table, and the second pointer may be a primary key of the particular record in the particular dimension table.

In some embodiments of the method, the hybrid fact table and each dimension table in the set of dimension tables include an expiry timestamp field identifying whether records in the hybrid fact table and the dimension tables have expired.

In some embodiments of the method, generating the response to the received query includes performing, by the query response circuitry, a join operation on the hybrid fact table and a subset of the set of dimension tables identifiable from the received query. In this regard, the join operation of an "as-is" query filters out records that have expired in both the hybrid fact table and the subset of the set of dimension tables, the join operation of an "as-was" query joins records in the hybrid fact table and the subset of the set of dimension tables that include a primary key provided in the received query, and the join operation of an "as-would-have-been" query filters out records in the subset of the set of dimension tables that have expired and joins records in the hybrid fact table that include a primary key provided in the received query.

In another example embodiment, a database system is contemplated that provides an efficient database architecture facilitating query flexibility. The database system includes data modeling circuitry configured to generate a database comprising a set of dimension tables and a hybrid fact table, wherein the set of dimension tables (i) specifies current values of one or more attributes corresponding to hybrid fact table records and (ii) preserves records of historical values of the one or more attributes, and wherein each hybrid fact table record identifies corresponding records in the set of dimension tables that specify (i) current values of the one or more attributes corresponding to the hybrid fact table record and (ii) records comprising historical values of the one or more attributes corresponding to the hybrid fact table record that were current at the time of creation of the hybrid fact table record. The database system further includes query response circuitry configured to receive a query requesting data from the database, generate a response to the received query using the set of dimension tables and the hybrid fact table, and transmit the response to the received query.

In some embodiments of the database system, the query specifies whether current or historical values of attributes corresponding to the hybrid fact table record are requested from each dimension table of the set of dimension tables.

In some embodiments of the database system, each hybrid fact table record identifies the corresponding records in the set of dimension tables by including two fields for each dimension table in the set of dimension tables, and the two fields for each particular dimension table store respective pointers comprising (i) a first pointer that specifies a record in the particular dimension table storing current values of attributes corresponding to the hybrid fact table record, and (ii) a second pointer that specifies a particular record in the particular dimension table storing values of the attributes stored in the particular dimension table that were current at the time of creation of the hybrid fact table record. In this regard, the first pointer may be a business key corresponding to the record in the particular dimension table, and the second pointer may be a primary key of the particular record in the particular dimension table.

In some embodiments of the database system, the hybrid fact table and each dimension table in the set of dimension tables include an expiry timestamp field identifying whether records in the hybrid fact table and the dimension tables have expired.

In some embodiments of the database system, the query response circuitry is configured to generate the response to the received query by performing a join operation on the hybrid fact table and a subset of the set of dimension tables identifiable from the received query. In this regard, the join operation of an "as-is" query filters out records that have expired in both the hybrid fact table and the subset of the set of dimension tables, the join operation of an "as-was" query joins records in the hybrid fact table and the subset of the set of dimension tables that include a primary key provided in the received query, and the join operation of an "as-would-have-been" query filters out records in the subset of the set of dimension tables that have expired and joins records in the hybrid fact table that include a primary key provided in the received query.

In another example embodiment, a computer program product comprising at least one non-transitory computer-readable storage medium is provided for utilizing an efficient database architecture while facilitating query flexibility. The at least one non-transitory computer-readable storage medium stores computer-executable instructions that, when executed, cause an apparatus to generate a database comprising a set of dimension tables and a hybrid fact table, wherein the set of dimension tables (i) specifies current values of one or more attributes corresponding to hybrid fact table records and (ii) preserves records of historical values of the one or more attributes, and wherein each hybrid fact table record identifies corresponding records in the set of dimension tables that specify (i) current values of the one or more attributes corresponding to the hybrid fact table record and (ii) records comprising historical values of the one or more attributes corresponding to the hybrid fact table record that were current at the time of creation of the hybrid fact table record. The computer-executable instructions, when executed, further cause the apparatus to receive a query requesting data from the database, generate a response to the received query using the set of dimension tables and the hybrid fact table, and transmit the response to the received query.

In some embodiments of the computer program product, the query specifies whether current or historical values of attributes corresponding to the hybrid fact table record are requested from each dimension table of the set of dimension tables.

In some embodiments of the computer program product, each hybrid fact table record identifies the corresponding records in the set of dimension tables by including two fields for each dimension table in the set of dimension tables, and the two fields for each particular dimension table store respective pointers comprising (i) a first pointer that specifies a record in the particular dimension table storing current values of attributes corresponding to the hybrid fact table record, and (ii) a second pointer that specifies a particular record in the particular dimension table storing values of the attributes stored in the particular dimension table that were current at the time of creation of the hybrid fact table record. In this regard, the first pointer may be a business key corresponding to the record in the particular dimension table, and the second pointer may be a primary key of the particular record in the particular dimension table.

In some embodiments of the computer program product, the hybrid fact table and each dimension table in the set of dimension tables include an expiry timestamp field identifying whether records in the hybrid fact table and the dimension tables have expired.

In some embodiments of the computer program product, the computer-executable instructions, when executed, further cause the apparatus to generate the response to the received query by causing the apparatus to perform a join operation on the hybrid fact table and a subset of the set of dimension tables identifiable from the received query. In this regard, the join operation of an "as-is" query filters out records that have expired in both the hybrid fact table and the subset of the set of dimension tables, the join operation of an "as-was" query joins records in the hybrid fact table and the subset of the set of dimension tables that include a primary key provided in the received query, and the join operation of an "as-would-have-been" query filters out records in the subset of the set of dimension tables that have expired and joins records in the hybrid fact table that include a primary key provided in the received query.

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention in any way. It will be appreciated that the scope of the invention encompasses many potential embodiments in addition to those here summarized, some of which will be further described below.

BRIEF DESCRIPTION OF THE DRAWINGS

Having described certain example embodiments of the present disclosure in general terms above, reference will now be made to the accompanying drawings, which are not necessarily drawn to scale.

FIGS. 2A-2D illustrate a set of dimension tables that may be used to facilitate database queries.

FIGS. 2E and 2F illustrate traditional fact tables that may be used to facilitate database queries.

FIGS. 3A-3D illustrate a set of dimension tables that may be used to facilitate database queries.

FIG. 3E illustrates an example hybrid fact table that improves database querying, in accordance with some example embodiments described herein.

FIG. 3F illustrates example responses to "as-is," "as-was," and "as-would-have-been" queries generated using example embodiments described herein.

DETAILED DESCRIPTION

Some embodiments of the present invention will now be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout. As used herein, the terms "data," "content," "information," and similar terms may be used interchangeably to refer to data capable of being transmitted, received, and/or stored in accordance with embodiments of the present invention. Thus, use of any such terms should not be taken to limit the spirit and scope of embodiments of the present invention.

Overview

Figure 1:
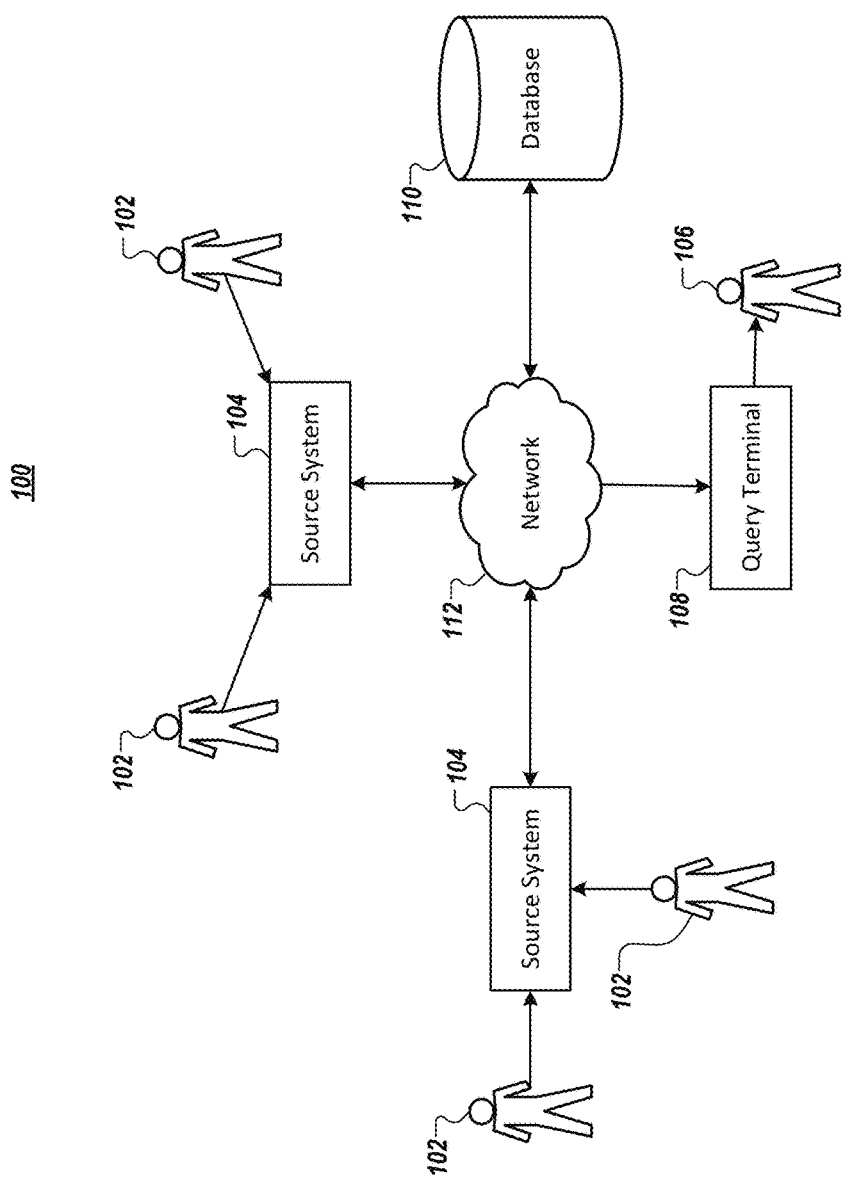
FIG. 1 illustrates a diagram illustrating a typical system relying upon a database system.

FIG. 1 illustrates a diagram illustrating a typical system 100 involving a database system. As shown in FIG. 1, a series of users 102 may enter data at various times and/or places into various source systems 104. In a global system connected by a network 112 (e.g., the Internet), a host platform 110 may utilize a database system to ingest and model this data and enable a user 106 of a query terminal 108 to query the database system managed by the host platform 110. However, as mentioned above, traditional approaches for modeling data either require duplicative effort or pose obstacles for future query operations.

Some traditional approaches require duplicative effort and wasteful allocation of resources to address the fact that the designers of the database system of host platform 110 may not know ahead of time what type of query a user 106 may want to run. In these circumstances, the database system may be designed using a conservative approach that facilitates both "as-is" and "as-was" reporting. Specifically, the database may be designed to maintain dimensions and facts in both type 1 and type 2 form to facilitate both "as-is" and "as-was" query operations. But this process requires redundant storage of data, which requires duplication of processing, development, testing, and maintenance of both the type 1 and the type 2 dimensions and facts. Example embodiments described herein are designed to deliver identical data using fewer processing resources, hardware space, and redundancy.

Other approaches pose obstacles for future query operations. For instance, another way to support "as-is" and "as-was" reporting is to use slowly changing dimension 7 (SCD-7 or type 7) dimension tables, such as those shown in FIGS. 2A-2D. Type 7 dimension tables have properties of both type 1 and type 2 tables, because they identify current records using a durable key (SCD1 Key in FIGS. 2A-2D, as shown in column 202) and a flag identifying which record having the durable key comprises a current record (while a current flag field is not shown in FIGS. 2A-2D, the current records 206, 208, 210, and 212, respectively, are illustrated using shading). In turn, historical attribute information can be viewed using a surrogate primary key (SCD2 Key in FIGS. 2A-2D, as shown in column 204) that uniquely identifies each dimension table record. The remaining columns in the type 7 dimension tables comprise attribute fields or plumbing fields, such as those discussed in U.S. patent application Ser. No. 15/086,534, filed Mar. 31, 2016, the entire contents of which are incorporated herein by reference. Accordingly, to have access to either the current record or a historical record of a type 7 dimension table, a fact table must be hardcoded to include fields for storing the durable key and/or surrogate primary key of the dimension table.

FIG. 2E illustrates one such hardcoded fact table, in which the rows identified by bracket 214 comprise fields for identifying the type 1 keys of the dimension tables shown in FIGS. 2A-2D. Because the fact table shown in FIG. 2E only hardcodes type 1 key information, the fact table cannot be used for "as-was" querying of the dimension tables. To ostensibly cure this defect, FIG. 2F illustrates another hardcoded fact table in which the rows identified by bracket 216 comprise fields for identifying type 2 keys corresponding to records in the dimension tables shown in FIGS. 2A-2D that were current at the time that the fact table records were entered into the fact table shown in FIG. 2F. Because the fact table shown in FIG. 2F hardcodes this type 2 key information of the corresponding dimension tables, the fact table can be used for "as-was" querying of those dimension tables, but it cannot be used for "as-is" querying.

Accordingly, a query for a combination of current and historical information from different dimension tables would require generation of yet another fact table having corresponding fields identifying the desired current and/or historical fields in the dimension tables. If the combination of information needed for such an inquiry is known prior to ingestion of data, then a third fact table could be generated without much difficulty. However, if the need for a new combination of current and historical information is only discovered after populating the dimension tables and fact tables, generating a new fact table at this later time may be a resource-intensive process, because hydrating the new fact table requires identification of appropriate type 2 keys for various dimension tables based on the time of ingestion of the various records in the new fact table (while this information can be derived, it may require a search of a large number of records). As these examples illustrate, traditional approaches utilizing type 7 dimension tables require designing fact tables using a priori knowledge of the specific queries that will be performed on the database, and populating new fact tables to enable additional query functionality after-the-fact can be a costly process.

Put another way, because each fact table must be hard-coded in advance to accommodate particular "as-is" and "as-was" reporting functionality, databases relying on type 7 dimension tables have traditionally provided a brittle reporting architecture. Accordingly, even if type 7 dimension tables mitigate the need to create duplicate dimension tables to access both current and historical attribute values, they introduce new problems.

Example embodiments described herein provide solutions that avoid the resource waste of duplicative data tables and the brittle nature of database systems using type 7 dimension tables. As shown in FIGS. 3A-3E, example embodiments solve these problems using hybrid fact tables that facilitate any type of "as-is" or "as-was" reporting that the user 106 may desire. Rather than utilize multiple fact tables to facilitate various reporting capabilities, the dimension tables illustrated in FIGS. 3A-3D (which are identical to those illustrated in FIGS. 2A-2D) are coupled with a single hybrid fact table, an example of which is shown in FIG. 3E. The hybrid fact table shown in FIG. 3E includes fields for a business key (e.g., SCD1 or type 1 key) and a primary key (e.g., SCD2 or type 2 key) for every dimension table corresponding to the hybrid fact table (bracket 302 illustrates the business key/primary key pair for the dimension table shown in FIG. 3A, bracket 304 illustrates the business key/primary key pair for the dimension table shown in FIG. 3B, and brackets 306 and 308 illustrate the corresponding business key/primary key pairs for FIGS. 3C and 3D, respectively). Each hybrid fact table record can thus access current records in any of the corresponding dimension table (via the business key fields in the hybrid fact table record) to enable "as-is" reporting for any dimension table. At the same time, each hybrid fact table record can also access a historical record in any of the corresponding dimension tables (via the primary key fields in the hybrid fact table record) to enable "as-was" reporting for any dimension table. In this fashion, the hybrid fact table shown in FIG. 3E enables any combination of "as-is" or "as-was" querying of the corresponding dimension tables shown in FIGS. 3A-3D.

Turning now to FIG. 3F, example responses to "as-is," "as-was," and "as-would-have-been" queries are provided that may be generated by example embodiments using the example dimension tables illustrated in FIGS. 3A-3D and the example hybrid fact table illustrated in FIG. 3E. As illustrated in FIG. 3F, dimension data retrieved from the dimension tables illustrated in FIGS. 3A, 3B, 3C, and 3D are provided in the bracketed columns 310, 312, 314, and 316, respectively. For the "as-is" reporting example, the various dimension tables are joined with the hybrid fact table using the SCD1 fields of the hybrid fact table corresponding to each of the dimension tables, and by filtering for records in the various tables that have not expired.

As an aside, certain embodiments described herein include an optional plumbing field comprising an expiry timestamp field (not shown in FIGS. 3A-3E) that identify a date/time when the corresponding record was overwritten (which may be referred to as EXPR_DTS). For a current record, this plumbing field may either be null or list 12/31/9999 or another similar indicator that the record has not been overwritten. Accordingly, to filter for records that have not expired, the "as-is" reporting process may filter for records in the various tables in which this EXPR_DTS field is null (or otherwise indicates that the record has not been overwritten). It is theoretically possible to derive which records have not expired on-the-fly using SQL analytics functions, which in some cases may render the EXPR_DTS field unnecessary for this reporting function. However, despite the ability to derive the value of this field from other fields, use of the EXPR_DTS field can reduce the processing time needed for certain queries significantly (e.g., a query for current lab results in embodiments not using the EXPR_DTS field could result in a search of millions of records, while a search for lab results filtering on the EXPR_DTS field could conclude much more quickly as it would evaluate a much smaller sample size).

Returning to the "as-is" reporting example, attribute data reported for each of these dimension tables is retrieved from the current record of each of these dimension tables, as identified using the respective SCD1 fields stored in the current record in the hybrid fact table shown in FIG. 3E, and further filtering for records in the various tables that have not expired. The reported attribute values shown by bracket 318 illustrate the results of an "as-is" reporting function. The shading in all of the reporting examples shown in FIG. 3F illustrate which of the returned values is retrieved from a current dimension or hybrid fact table record, while unshaded attribute values have been retrieved from historical records. As expected, all attribute data reported for the "as-is" reporting function is shaded.

For the "as-was" reporting example, shown by bracket 320, the various dimension tables are joined with the hybrid fact table using the SCD2 fields of the hybrid fact table corresponding to each of the dimension tables, without filtering. Because several of the dimension table records identified in the SCD2 fields of the current hybrid fact table record are no longer current, the "as-was" reporting function produces a reporting outcome in which not all attribute values are shaded. Specifically, although in FIG. 3A the historical record identified in the corresponding SCD2 field of the hybrid fact table for the date of the as-was request has not changed since and is still the current record, the same is not true of any of the other dimension tables.

Another final report example is shown in FIG. 3F and comprises an "as-would-have-been" reporting example. The "as-would-have-been" query joins a selected fact table record with current dimension table records, and as a result produces an outcome with current dimension attribute values, but using a potentially out-of-date hybrid fact table record. In the example shown in bracket 322 of FIG. 3F, the "as-would-have-been" reporting example produces an out-of-date charge value retrieved from the historical record in the hybrid fact table itself rather than the current record that has revised the charge from $100.00 to $200.00. To produce an "as-would-have-been" result, the various dimension tables are joined with the hybrid fact table using the SCD1 fields corresponding to each of the dimension table and filtering for records in the various dimension tables that have not expired. Rather than filtering the hybrid fact table for records that have not expired, however, "as-would-have-been" reporting utilizes a particular hybrid fact table record.

As illustrated in connection with FIGS. 3A-3F, example embodiments described herein address the inefficiencies and/or deficiencies of traditional database architectures and provide methods and apparatuses that enable database systems to provide "as-is" and "as-was" (and "as-would-have-been") reporting functionality while significantly reducing the processing, storage, and data redundancy requirements of traditional methods for providing this functionality. Through the use of a hybrid fact table in which records store the business keys and primary keys for every corresponding dimension table, example embodiments provide the flexibility to efficiently query the database for any combination of current and/or historical facts and attributes without the need to generate new fact tables for any such query, while also avoiding the need for use of redundant data tables and the concomitant resource expenditures.

System Architecture

Methods, apparatuses, and computer program products of the present invention may be embodied by any of a variety of devices. Example embodiments may include a plurality of devices operating in a globally-networked system. In doing so, example embodiments may utilize any of a variety of fixed terminals, such as desktop computers, mainframe devices, kiosks, or the like. Similarly, example embodiments may also utilize any of a variety of mobile terminals, such as a portable digital assistant (PDA), mobile telephone, smartphone, laptop computer, tablet computer, or any combination of the aforementioned devices.

Figure 4:
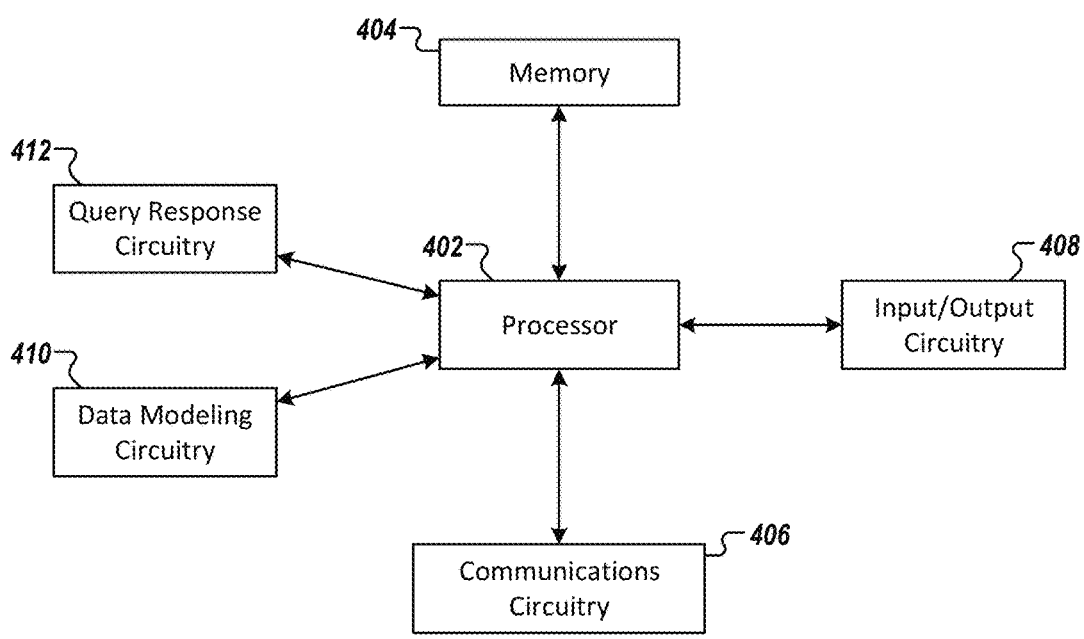
FIG. 4 illustrates a schematic block diagram of example circuitry embodying a device that may perform operations in accordance with some example embodiments described herein.

Turning to FIG. 4, an example apparatus 400 is illustrated that may represent a basic set of components of a device embodying an example system. The apparatus 400 may include a processor 402, a memory 404, and communications circuitry 406. In some embodiments, the device may further include input/output circuitry 408 for interacting with a user, data modeling circuitry 410 for generating a database comprising a set of dimension tables and a hybrid fact table, and query response circuitry 412 for generating and transmitting responses to received queries. The apparatus 400 may be configured to execute the operations described below in connection with FIGS. 5-7. Although these components 402-412 are described with some functional descriptors, it should be understood that the particular implementations necessarily include the use of particular hardware. It should also be understood that certain of these components 402-412 may include similar or common hardware. For example, the data modeling circuitry 410 and query response circuitry 412 may leverage use of the processor 402, memory 404, communications circuitry 406, and/or input/output circuitry 408 to perform their associated functions, and duplicate hardware is not required for the distinct components of the apparatus 400 (although embodiments using duplicated hardware are also contemplated herein). The use of the term "circuitry" as used herein with respect to components of the apparatus therefore includes particular hardware configured to perform the functions associated with the particular circuitry described herein. Of course, while the term "circuitry" should be understood broadly to include hardware, in some embodiments, circuitry may also include software for configuring the hardware components of the apparatus 400.

In some embodiments, the processor 402 (and/or co-processor or any other processing circuitry assisting or otherwise associated with the processor) may be in communication with the memory 404 via a bus for passing information among components of the apparatus. The processor 402 may be embodied in a number of different ways and may, for example, include one or more processing devices configured to perform independently. Additionally or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processor 402 may be configured to execute instructions stored in the memory 404 or otherwise accessible to the processor. Alternatively or additionally, the processor may be configured to execute hard-coded functionality. As such, whether configured by hardware or software methods, or by a combination of hardware with software, the processor may represent an entity (e.g., physically embodied in circuitry) capable of performing operations according to an embodiment of the present invention while configured accordingly. Alternatively, as another example, when the processor is embodied as an executor of software instructions, the instructions may specifically configure the processor to perform the algorithms and/or operations described herein when the instructions are executed.

In some embodiments, the memory 404 may be non-transitory and may include, for example, one or more volatile and/or non-volatile memories. In other words, for example, the memory may be an electronic storage device (e.g., a computer readable storage medium). The memory 404 may be configured to store information, data, content, applications, instructions, or the like, for enabling the apparatus to carry out various functions in accordance with example embodiments contemplated herein.

The communications circuitry 406 may be any means such as a device or circuitry embodied in either hardware or a combination of hardware and software that is configured to receive and/or transmit data from/to a network and/or any other device, circuitry, or module in communication with the apparatus 400. In this regard, the communications circuitry 406 may include, for example, a network interface for enabling communications with a wired or wireless communication network. For example, the communications circuitry 406 may include one or more network interface cards, antennae, buses, switches, routers, modems, and supporting hardware and/or software, or any other device suitable for enabling communications via a network. Additionally or alternatively, the communication interface 406 may include the circuitry for interacting with the antenna(s) to cause transmission of signals via the antenna(s) or to handle receipt of signals received via the antenna(s). These signals may be transmitted by the apparatus 400 using any of a number of wireless personal area network (PAN) technologies, such as Bluetooth® v1.0 through v3.0, Bluetooth Low Energy (BLE), infrared wireless (e.g., IrDA), ultra-wideband (UWB), induction wireless transmission, or the like. In addition, it should be understood that these signals may be transmitted using Wi-Fi, Near Field Communications (NFC), Worldwide Interoperability for Microwave Access (WiMAX) or other proximity-based communications protocols.

In some embodiments, the apparatus 400 may include input/output circuitry 408 that may, in turn, be in communication with processor 402 to provide output to a user and, in some embodiments, to receive an indication of user input. The input/output circuitry 408 may comprise a user interface and may include a display that may include a web user interface, a mobile application, a client device, or the like. In some embodiments, the input/output circuitry 408 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 104, and/or the like).

In addition, the apparatus 400 may also comprise data modeling circuitry 410, which includes hardware components designed to populate a data model based on the staged data. Data modeling circuitry 410 may utilize processor 402, memory 404, or any other hardware component included in the apparatus 400 to perform these functions. Data modeling circuitry 410 may further utilize communications circuitry 106 to receive data from a variety of data sources.

Data modeling circuitry 410 may utilize processing circuitry, such as the processor 402, to facilitate performance of its various operations, and may utilize memory 404 to store state computer instructions that, when executed, cause the data modeling circuitry 410 to perform those operations. It should be appreciated that, in some embodiments, data modeling circuitry 410 may include a separate processor, specially configured field programmable gate array (FPGA), or application specific interface circuit (ASIC) to perform the above-described functions. Data modeling circuitry 410 is therefore implemented using hardware components of the apparatus configured by either hardware or software for implementing these planned functions.

In addition, the apparatus 400 may also comprise query response circuitry 412, which includes hardware components designed to generate and transmit responses to received queries. Query response circuitry 412 may utilize processor 402, memory 404, or any other hardware component included in the apparatus 400 to perform this function.

Query response circuitry 412 may utilize processing circuitry, such as the processor 402, to facilitate performance of its various operations, and may utilize memory 404 to store state computer instructions that, when executed, cause the query response circuitry 412 to perform its operations. It should be appreciated that, in some embodiments, query response circuitry 412 may include a separate processor, specially configured field programmable gate array (FPGA), or application specific interface circuit (ASIC) to perform the above-described functions. Query response circuitry 412 is therefore implemented using hardware components of the apparatus configured by either hardware or software for implementing these planned functions.

As described above and as will be appreciated based on this disclosure, example embodiments may be implemented by a plurality of devices, such as fixed devices, mobile devices, backend network devices, and/or the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

It should be appreciated, with respect to certain devices embodied by apparatus 400 as described in FIG. 4, computer program instructions and/or other type of code may be loaded onto a computer, processor or other programmable apparatus's circuitry to produce a machine, such that the computer, processor other programmable circuitry that execute the code on the machine create the means for implementing various functions described herein.

Having described specific components of an example device (e.g., apparatus 400) that may be utilized to implement some embodiments of the database described above, example embodiments of the present invention are described below in connection with a series of flowcharts.

Operations for Improved Database Querying

Figure 5:
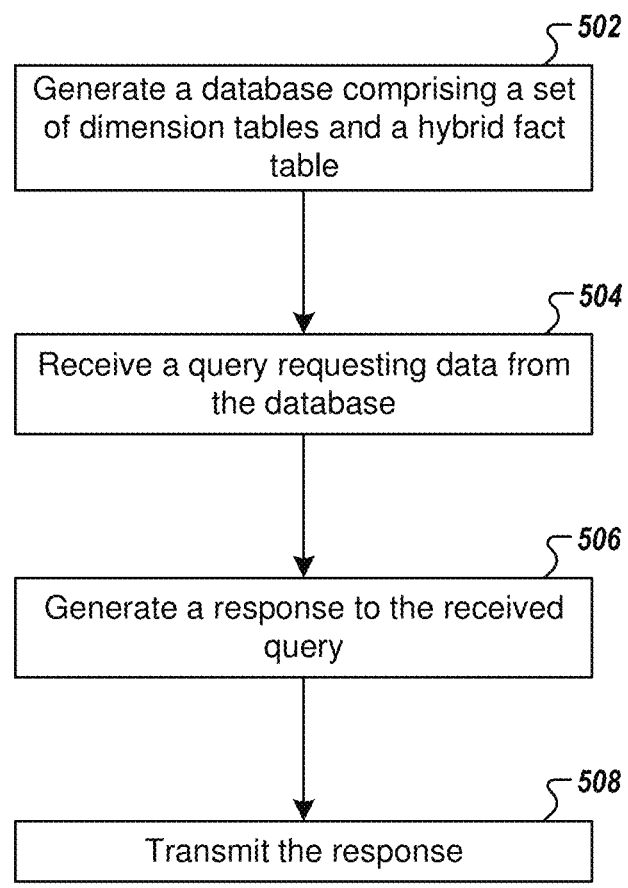
FIG. 5 illustrates a flowchart describing example operations performed by a database system to utilize an efficient database architecture while facilitating query flexibility, in accordance with some example embodiments described herein.

Turning to FIG. 5, a flowchart is illustrated that contain operations for generating and utilizing an improved database architecture to facilitate improved database querying. The operations illustrated in FIG. 5 may, for example, be performed by, with the assistance of, and/or under the control of an apparatus 400 embodying a device operatively controlling a database system and more particularly through the use of one or more of processor 402, memory 404, communications circuitry 406, input/output circuitry 408, data modeling circuitry 410, and query response circuitry 412.

Turning now to operation 502, the apparatus 400 includes means, such as data modeling circuitry 410 or the like, for generating a database comprising a set of dimension tables and a hybrid fact table. As described previously in connection with FIGS. 2A-2D and 3A-3D, the set of dimension tables may specify current values of one or more attributes corresponding to hybrid fact table records while preserving records of historical values of the one or more attributes. In some embodiments, the set of dimension tables may comprise a set of type 1 dimension tables and a separate coextensive set of type 2 dimension tables, as described previously. In other embodiments, the set of dimension tables may comprise type 7 dimension tables, as also described previously.

In some embodiments, the database may involve generation of a staging layer followed by generation of a data integration layer facilitating the hydration of the set of dimension tables and the hybrid fact table. In this regard, generation of the staging layer may be performed in the manner described in U.S. patent application Ser. No. 15/086,534, filed Mar. 31, 2016, the entire contents of which are incorporated herein by reference. Moreover, generating this data integration layer may include generation of one or more data alignment tables and one or more corresponding key mapping tables, as described in connection with FIG. 5 of U.S. patent application Ser. No. 15/086,266, filed Mar. 31, 2016, the entire contents of which are incorporated herein by reference. However, it will also be understood that example embodiments described herein may be utilized in alternative data modeling platforms having a different data modeling schema, such as those using Inmon, Kimball, data vault, or anchor modeling techniques.

As described previously in connection with FIG. 3E, the hybrid fact table may diverge from the fact tables illustrated in FIGS. 2E and 2F. Specifically, the hybrid fact table may be designed such that each hybrid fact table record identifies corresponding records in the set of dimension tables that specify (i) current values of the one or more attributes corresponding to the hybrid fact table record and (ii) records comprising historical values of the one or more attributes corresponding to the hybrid fact table record that were current at the time of creation of the hybrid fact table record.

In one example embodiment, each hybrid fact table record identifies the corresponding records in the set of dimension tables by including two fields for each dimension table in the set of dimension tables. The two fields comprise, for each particular dimension table, (i) a first pointer that specifies a record in the particular dimension table storing current values of attributes corresponding to the hybrid fact table record, and (ii) a second pointer that specifies a particular record in the particular dimension table storing values of the attributes stored in the particular dimension table that were current at the time of creation of the hybrid fact table record.

In this regard, the first pointer may be a business key corresponding to the record in the particular dimension table. In this regard, the business key may comprise a natural or durable key identifying the record in the particular dimension table. However, when utilizing a type 2 technique in the particular dimension table, it is possible that multiple records will reference this same business key. In such situations, the business key may identify a series of records in the particular dimension table, although only one of those records will not have expired. Accordingly, through use of the business key and an EXPR_DTS field (or on-the-fly expiration identification), the hybrid fact table specifies the current record in the particular dimension table (e.g., the record storing current values of attributes corresponding to the hybrid fact table record).

Moreover, the second pointer may be a primary key of the particular record in the particular dimension table. This primary key (e.g., PRIM_KEY) may comprise a hash of all of the source data fields with a load date/time stamp (e.g., LOAD_DTS). The benefit of this method for generating the PRIM_KEY field is that it is exceedingly likely that it will be globally unique (as a result of incorporating the LOAD_DTS date/time stamp into the hash). The benefit of having a globally unique key of this nature is that it can ensure that the second pointer is guaranteed to identify the intended record within a particular dimension table.

By designing the hybrid fact table in this fashion, the database system enables any combination of "as-is" and "as-was" query functions without the need to generate any additional fact tables. In some embodiments, the hybrid fact table and the dimension tables in the set of dimension tables include an expiry timestamp field identifying whether records in the hybrid fact table and the dimension tables have expired. As discussed previously, including an EXPR_DTS field of this nature avoids potentially resource-intensive querying to identify whether records in particular tables have expired. From operation 502, the procedure may advance to operation 504 in an instance in which a user query is received.

In operation 504, the apparatus 400 includes means, such as communications circuitry 506, input/output circuitry 408, or the like, for receiving a query requesting data from the generated database. The query may identify a subset of the set of dimension tables from which attribute data is requested, and may further identify whether the data requested from each dimension table and from the hybrid fact table comprises current data (an "as-is" query of the corresponding table) or historical data (an "as-was" query of the corresponding table). In some embodiments, the query may request historical information from the hybrid fact table and current information from one or more dimension tables (an "as-would-have-been" query), as discussed previously in connection with FIG. 3F.

Operations 506 and 508 describe procedures for responding to user queries. First, in operation 506, the apparatus 400 may include means, such as query response circuitry 412 or the like, for generating a response to the received query using the set of dimension tables and the hybrid fact table. In embodiments utilizing a staging layer and a data integration layer, operation 506 may include processing the received query, identifying, using a data integration layer and a subset of the one or more stage tables, data corresponding to the information for retrieval, and outputting the identified data. More specifically, the apparatus 400 may identify the information for retrieval using the data integration layer of the data modeling platform, and the apparatus 400 can then retrieve identifying data from within the data integration layer or from one or more of the stage tables, and then output the collected information.

In some embodiments, generating the response to the received query includes performing, by the query response circuitry, a join operation on the hybrid fact table and a subset of the set of dimension tables identifiable from the received query. When fielding "as-is" queries, this join operation filters out records that have expired in both the hybrid fact table and the subset of the set of dimension tables. When fielding "as-was" queries, this join operation joins records in the hybrid fact table and the subset of the set of dimension tables that include a primary key provided in the received query. Finally, when fielding "as-would-have-been" queries, the join operation filters out records in the subset of the set of dimension tables that have expired and joins records in the hybrid fact table that include a primary key provided in the received query.

After generating the response to the received query, the procedure advances to operation 508, in which the apparatus 400 includes means, such as query response circuitry 412, for transmitting the response to the query back to the requesting device. Referring to FIG. 1, this requesting device may be the query terminal 110, which may be local to or remote from the database system. In an instance in which the query terminal 110 comprises an element of the database system, the query response circuitry 412 may utilize input/output circuitry 408 of the apparatus 400 to transmit the response to the query to a user 106 interacting with the query terminal 110. In an instance in which the query terminal 110 comprises a remote element not included within the database system, the query response circuitry 412 may utilize communications circuitry 406 to transmit the response to the query to the query terminal 110, which in turn may convey the response to the user 106.

As described above, example embodiments described herein provide methods and apparatuses that can increase the efficiency of database systems while maintaining the flexibility to provide "as-is" and "as-was" reporting functionality. Efficiency is increased over traditional architectures that rely on complete sets of type 1 and type 2 dimensions and facts by significantly reducing the processing, storage, and data redundancy requirements of the database system. Through the use of a hybrid fact table in which records store the business keys and primary keys for every corresponding dimension table, example embodiments also provide flexibility not found in traditional database systems using type 7 dimension tables by enabling any combination of "as-is" and "as-was" query functions without the need to generate new fact tables for any such query.

FIG. 5 illustrates a flowchart describing the operation of apparatuses, methods, and computer program products according to example embodiments of the invention. It will be understood that each block of the flowchart, and combinations of blocks in the flowchart, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by a memory of an apparatus 400 employing an embodiment of the present invention and executed by a processor of the apparatus 400. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture, the execution of which implements the functions specified in the flowchart blocks. The computer program instructions may also be loaded onto a computer or other programmable apparatus to cause a series of operations to be performed on the computer or other programmable apparatus to produce a computer-implemented process such that the instructions executed on the computer or other programmable apparatus provide operations for implementing the functions specified in the flowchart blocks.

The flowchart blocks support combinations of means for performing the specified functions and combinations of operations for performing the specified functions. It will be understood that one or more blocks of the flowcharts, and combinations of blocks in the flowcharts, can be implemented by special purpose hardware-based computer systems which perform the specified functions, or combinations of special purpose hardware and computer instructions.

In some embodiments, some of the operations above may be modified or further amplified. Furthermore, in some embodiments, additional optional operations may be included. Modifications, amplifications, or additions to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method for utilizing an efficient database architecture while facilitating query flexibility, the method comprising:
   generating, by data modeling circuitry of a database system, a database comprising a set of dimension tables and a hybrid fact table, wherein the set of dimension tables (i) specifies current values of one or more attributes corresponding to hybrid fact table records and (ii) preserves records of historical values of the one or more attributes, and wherein each hybrid fact table record identifies corresponding records in the set of dimension tables that specify (i) current values of the one or more attributes corresponding to the hybrid fact table record and (ii) records comprising historical values of the one or more attributes corresponding to the hybrid fact table record that were current at the time of creation of the hybrid fact table record;
   receiving a query requesting data from the database;
   generating, by query response circuitry of the database system, a response to the received query using the set of dimension tables and the hybrid fact table; and
   transmitting, by the query response circuitry, the response to the received query.

2. The method of claim 1, wherein the query specifies whether current or historical values of attributes corresponding to the hybrid fact table record are requested from each dimension table of the set of dimension tables.

3. The method of claim 1, wherein each hybrid fact table record identifies the corresponding records in the set of dimension tables by including two fields for each dimension table in the set of dimension tables, and wherein the two fields for each particular dimension table store respective pointers comprising (i) a first pointer that specifies a record in the particular dimension table storing current values of attributes corresponding to the hybrid fact table record, and (ii) a second pointer that specifies a particular record in the particular dimension table storing values of the attributes stored in the particular dimension table that were current at the time of creation of the hybrid fact table record.

4. The method of claim 3, wherein the first pointer comprises a business key corresponding to the record in the particular dimension table.

5. The method of claim 3, wherein the second pointer comprises a primary key of the particular record in the particular dimension table.

6. The method of claim 1, wherein the hybrid fact table and each dimension table in the set of dimension tables include an expiry timestamp field identifying whether records in the hybrid fact table and the dimension tables have expired.

7. The method of claim 1, wherein generating the response to the received query includes: performing, by the query response circuitry, a join operation on the hybrid fact table and a subset of the set of dimension tables identifiable from the received query.

8. The method of claim 7, wherein the join operation filters out records that have expired in both the hybrid fact table and the subset of the set of dimension tables.

9. The method of claim 7, wherein the join operation joins records in the hybrid fact table and the subset of the set of dimension tables that include a primary key provided in the received query.

10. The method of claim 7, wherein the join operation filters out records in the subset of the set of dimension tables that have expired and joins records in the hybrid fact table that include a primary key provided in the received query.

11. A database system providing an efficient database architecture facilitating query flexibility, the database system comprising:
    data modeling circuitry configured to generate a database comprising a set of dimensiontables and a hybrid fact table, wherein the set of dimension tables (i) specifies current values of one or more attributes corresponding to hybrid fact table records and (ii) preserves records of historical values of the one or more attributes, and wherein each hybrid fact table record identifies corresponding records in the set of dimension tables that specify (i) current values of the one or more attributes corresponding to the hybrid fact table record and (ii) records comprising historical values of the one or more attributes corresponding to the hybrid fact table record that were current at the time of creation of the hybrid fact table record; and query response circuitry configured to:
receive a query requesting data from the database,
generate a response to the received query using the set of dimension tables and the hybrid fact table, and
transmit the response to the received query.

12. The database system of claim 11, wherein each hybrid fact table record identifies the corresponding records in the set of dimension tables by including two fields for each dimension table in the set of dimension tables, and wherein the two fields for each particular dimension table store respective pointers comprising (i) a first pointer that specifies a record in the particular dimension table storing current values of attributes corresponding to the hybrid fact table record, and (ii) a second pointer that specifies a particular record in the particular dimension table storing values of the attributes stored in the particular dimension table that were current at the time of creation of the hybrid fact table record.

13. The database system of claim 11, wherein the query response circuitry is further configured to generate the response to the received query by performing, by the query response circuitry, a join operation on the hybrid fact table and a subset of the set of dimension tables identifiable from the received query.

14. The database system of claim 13, wherein the query response circuitry is further configured to perform the join operation by filtering out records that have expired in both the hybrid fact table and the subset of the set of dimension tables.

15. The database system of claim 13, wherein the query response circuitry is further configured to perform the join operation by joining records in the hybrid fact table and the subset of the set of dimension tables that include a primary key provided in the received query.

16. The database system of claim 13, wherein the query response circuitry is further configured to perform the join operation by:
filtering out records in the subset of the set of dimension tables that have expired; and
joining records in the hybrid fact table that include a primary key provided in the received query.

17. A computer program product comprising at least one non-transitory computer-readable storage medium for utilizing an efficient database architecture while facilitating query flexibility, the at least one non-transitory computer-readable storage medium storing computer-executable instructions that, when executed, cause an apparatus to:

generate a database comprising a set of dimension tables and a hybrid fact table, wherein the set of dimension tables (i) specifies current values of one or more attributes corresponding to hybrid fact table records and (ii) preserves records of historical values of the one or more attributes, and wherein each hybrid fact table record identifies corresponding records in the set of dimension tables that specify (i) current values of the one or more attributes corresponding to the hybrid fact table record and (ii) records comprising historical values of the one or more attributes corresponding to the hybrid fact table record that were current at the time of creation of the hybrid fact table record;

receive a query requesting data from the database;
generate a response to the received query using the set of dimension tables and the hybrid fact table; and
transmit the response to the received query.

18. The computer program product of claim 17, wherein each hybrid fact table record identifies the corresponding records in the set of dimension tables by including two fields for each dimension table in the set of dimension tables, and wherein the two fields for each particular dimension table store respective pointers comprising (i) a first pointer that specifies a record in the particular dimension table storing current values of attributes corresponding to the hybrid fact table record, and (ii) a second pointer that specifies a particular record in the particular dimension table storing values of the attributes stored in the particular dimension table that were current at the time of creation of the hybrid fact table record.

19. The computer program product of claim 17, wherein the computer-executable instructions, when executed, further cause the apparatus to generate the response to the received query by causing the apparatus to:
perform a join operation on the hybrid fact table and a subset of the set of dimension tables identifiable from the received query.

20. The computer program product of claim 19, wherein the computer-executable instructions, when executed, further cause the apparatus to perform the join operation by causing the apparatus to:
filter out records that have expired in both the hybrid fact table and the subset of the set of dimension tables;
join records in the hybrid fact table and the subset of the set of dimension tables that include a primary key provided in the received query; or
filter out records in the subset of the set of dimension tables that have expired and join records in the hybrid fact table that include a primary key provided in the received query.

* * * * *